(12) United States Patent
Li et al.

(10) Patent No.: US 8,910,870 B2
(45) Date of Patent: Dec. 16, 2014

(54) SYSTEM AND METHOD FOR DOCUMENT PROCESSING

(75) Inventors: Jingquan Li, Auburn, NY (US); Justin Hnatow, New York, NY (US); Timothy Meier, Camillus, NY (US); Stephen Patrick Deloge, Palmyra, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1138 days.

(21) Appl. No.: 12/852,031

(22) Filed: Aug. 6, 2010

(65) Prior Publication Data

US 2012/0031962 A1    Feb. 9, 2012

(51) Int. Cl.
*G06K 19/00*    (2006.01)
*G06K 7/14*    (2006.01)

(52) U.S. Cl.
CPC ............ *G06K 7/14* (2013.01); *G06K 7/1443* (2013.01); *G06K 7/1447* (2013.01)
USPC ....... 235/462.01; 235/435; 235/439; 235/454

(58) Field of Classification Search
USPC ......................................... 235/462
See application file for complete search history.

(56) References Cited

U.S. PATENT DOCUMENTS

| | | |
|---|---|---|
| 6,398,117 B1 | 6/2002 | Oakeson et al. |
| 6,561,428 B2 | 5/2003 | Meier et al. |
| 7,246,754 B2 | 7/2007 | Siuta et al. |
| 7,252,222 B2 | 8/2007 | Finnerty et al. |
| 7,523,864 B2 | 4/2009 | Manheim |
| 2005/0067487 A1 | 3/2005 | Brundage et al. |
| 2005/0226541 A1 | 10/2005 | McIntosh et al. |
| 2006/0157559 A1 | 7/2006 | Levy et al. |
| 2007/0215704 A1* | 9/2007 | Yamada et al. ............... 235/454 |
| 2008/0110808 A1 | 5/2008 | Takahashi |
| 2008/0166013 A1 | 7/2008 | Ishikawa et al. |

FOREIGN PATENT DOCUMENTS

| | | |
|---|---|---|
| EP | 1868137 A1 | 12/2007 |
| JP | 2002304597 A | 10/2002 |
| WO | 2006112866 A2 | 10/2006 |

OTHER PUBLICATIONS

Jun. 7, 2013 Office Action in European Application No. 11175888.4, 4 pages.
Dec. 1, 2011 European Search Report in European Application No. 11175888.4.

* cited by examiner

*Primary Examiner* — Matthew Mikels
(74) *Attorney, Agent, or Firm* — Additon, Higgins & Pendleton, P.A.

(57) ABSTRACT

Embodiments of the present invention are directed to document processing, and more particularly to systems and methods that can utilize relative positions between the content of the document and a decodable indicia affixed to the document. In one embodiment, indicia reading terminals are provided that include an imaging module for capturing a frame of image data of a document. The document can include one or more decodable indicia such as a form barcode and various content fields, which delineate particular content of the document. The form barcode can include information respecting the form design and form design data. This information can be used to process the content of the document such as by providing coordinates or similar location and positioning metrics for use in processing the content of the document. In one example, the frame of image data is analyzed to identify the form barcode, from which the relative location of the content fields can be discerned without extensive processing of the frame of image data.

18 Claims, 9 Drawing Sheets

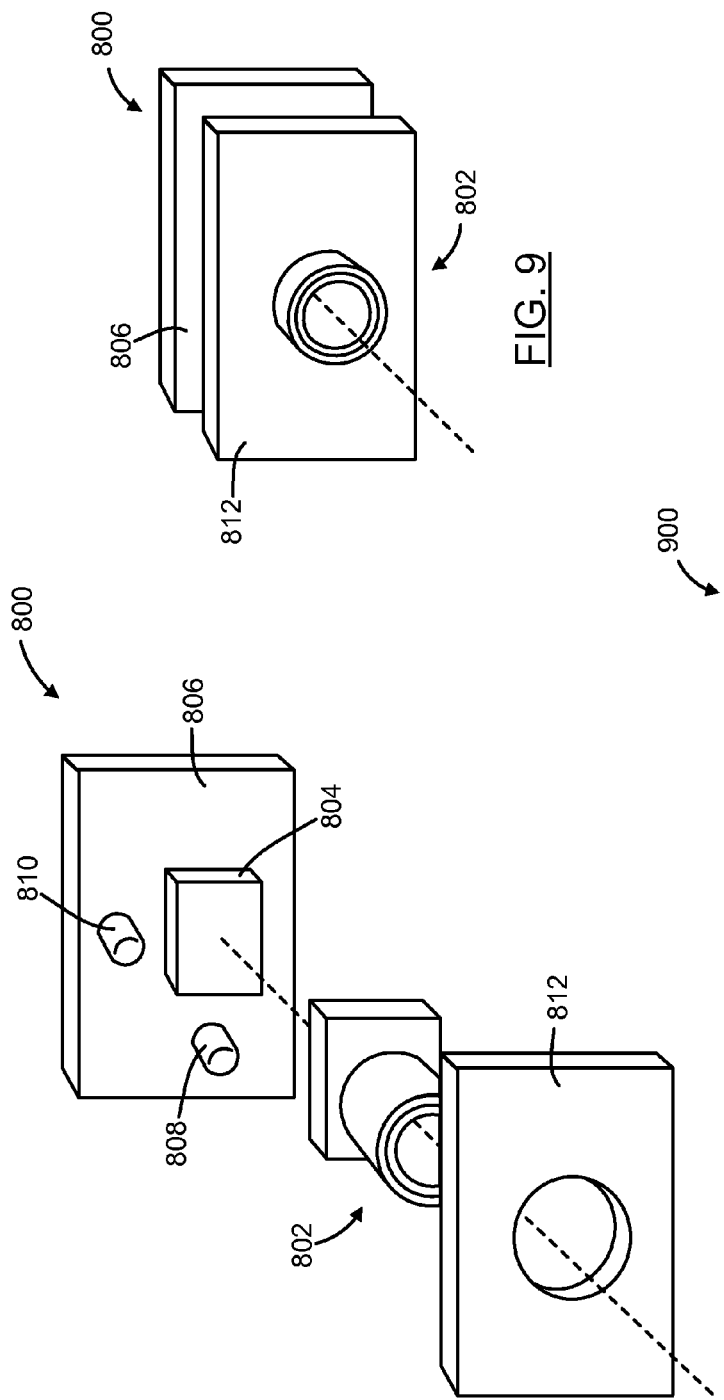
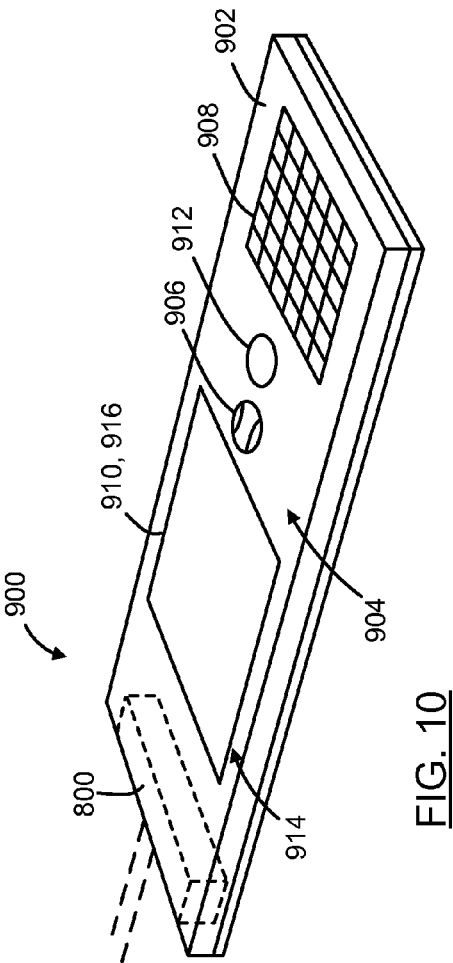

SYSTEM AND METHOD FOR DOCUMENT PROCESSING

FIELD OF THE INVENTION

The present invention relates to systems and method for processing documents, and more particularly to an embodiment of a system, and method implementing the same, in which content of the document is identified relative to a reference associated with a decodable indicia affixed to the document.

BACKGROUND OF THE INVENTION

Indicia reading terminals are available in multiple varieties. Well-known among the varieties is the gun style terminal as commonly seen at retail store checkout counters. Other terminals are also available that provide enhanced functions, have keyboards, and displays, and include advanced networking communication capabilities.

These terminals are useful to read and decode the information encoded in decodable indicia. Such decodable indicia are utilized generously, from encoding shipping and tracking information for packages to any number of forms and documents including, but not limited to, tax forms, order forms, transaction forms, survey forms, delivery forms, prescriptions, receipts, newspapers, product documents, reports, and the like. Moreover, while terminals and scanners are commonly used to decode the decodable indicia on these forms and documents, other devices may be used such as devices that can produce a digital version of the form and/or the document.

These devices typically utilize image sensors to decode information encoded in bar code symbols, and more particularly to process with bar code decoding algorithms captured images of the forms and documents. The availability of higher density image sensor arrays such as arrays that have ever increasing numbers of pixels, however, has increased the numbers of pixel values that must be processed to obtain the information coded in, e.g., the bar code symbology. Although the greater number of pixel values generally provides image representations of higher resolution, such resolution comes at the cost of processing speed.

There is a need for systems that include these terminals for processing documents that are operatively configured to identify content of the document in a highly reliable and accurate fashion without substantially sacrificing processing time.

SUMMARY OF THE INVENTION

As discussed in more detail below, there is provided systems and methods for processing documents that have improved processing characteristics. Embodiments of these systems can include indicia reading terminals operatively configured to decode decodable indicia affixed to the document to locate content relative to a reference associated with the decodable indicia.

In one embodiment, a system for processing a document. The system comprises an indicia reading terminal comprising a two dimensional image sensor array comprising a plurality of pixels extending along an image plane, an optical assembly for use in focusing imaging light rays onto the plurality of pixels of said two dimensional image sensor array, and a housing encapsulating the two dimensional image sensor array and the optical assembly. In one example, the system is operative in a mode in which the system, in response to an operator initiated command, captures a frame of image data and processes the frame of image data for attempting to decode a form barcode on the document. In another example, the system is operative to identify a coordinate system on an image plane from information stored in the form barcode. In yet another example, the system is yet further operative to identify relative to the form barcode and in the coordinate system the position of a content field located on the document. In still yet another example of the system, processing of the frame of image data on a first document having the form barcode disposed thereon is faster than processing of the frame of image data on a second document without the form barcode.

In another embodiment, a system for automatedly handling documents. The system comprises an indicia reading terminal comprising a two dimensional image sensor array comprising a plurality of pixels extending along an image plane, an optical assembly for use in focusing imaging light rays onto the plurality of pixels of said two dimensional image sensor array, and a housing encapsulating the two dimensional image sensor array and the optical assembly. The system also comprises an external server in communication with the indicia reading terminal, the external server external to the indicia reading terminal. In one example, the system is operative in a mode in which the system, in response to an operator initiated command, captures a frame of image data and processes the frame of image data for attempting to decode a form barcode on the document. In another example, the system is operative to form an image plan on which is located a grid respecting a coordinate system. In yet another example of the system, the grid has grid points established from at least one corner of the form barcode. In still another example, the system is operative to identify on the grid a content field with coordinates in the coordinate system that correspond to information encoded in the form barcode. In still yet another example of the system, processing of the frame of image data on a first document having the form barcode disposed thereon is faster than processing of the frame of image data on a second document without the form barcode.

In yet another embodiment, a method of processing a document comprises a step for capturing a frame of image data corresponding to the document and a step for processing the frame of image data to locate a form barcode affixed to the document. The method also comprises a step for establishing a coordinate system on an image plane respecting the captured image data. The method further comprises a step for locating relative to the form barcode and on the coordinate system a content field on the document. In one example of the method, processing of the frame of image data on a first document having the form barcode disposed thereon is faster than processing of the frame of image data on a second document without the form barcode.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which:

FIG. 8 is a is a perspective, exploded, assembly view of an example of an imaging module for use in the indicia reading terminal of FIG. 3;

FIG. 9 is a perspective, assembled view of another example of an imaging module such as the imaging module of FIG. 5, for use in the indicia reading terminal of FIG. 3;

FIG. 10 is a perspective view of an indicia reading terminal incorporating an imaging module such as the imaging module of FIGS. 6 and 7.

DETAILED DESCRIPTION OF THE INVENTION

Concepts of the present invention that are presented below can be implemented as part of document management and/or document processing systems that are configured to capture image data of a document, to process the captured document image data, and to identify aspects (or areas or fields) of the document by way of processing the captured document image data. To reduce processing time, and thus improve throughput, accuracy, and reliability of such systems, embodiments of the present disclosure can utilize decodable indicia such as bar codes to identify the aspects of the document upon which the decodable indicia is affixed. One embodiment, for example, can implement decodable indicia or a form barcode with information decoded therein respecting the location, position, and other characteristics that correlate the locality of fields within the document relative to the form barcode. This correlation is beneficial because it can reduce processing time and the possibility of error by bringing forward during processing information about the document which would normally require extensive processing of the captured document image data.

Figure 1:
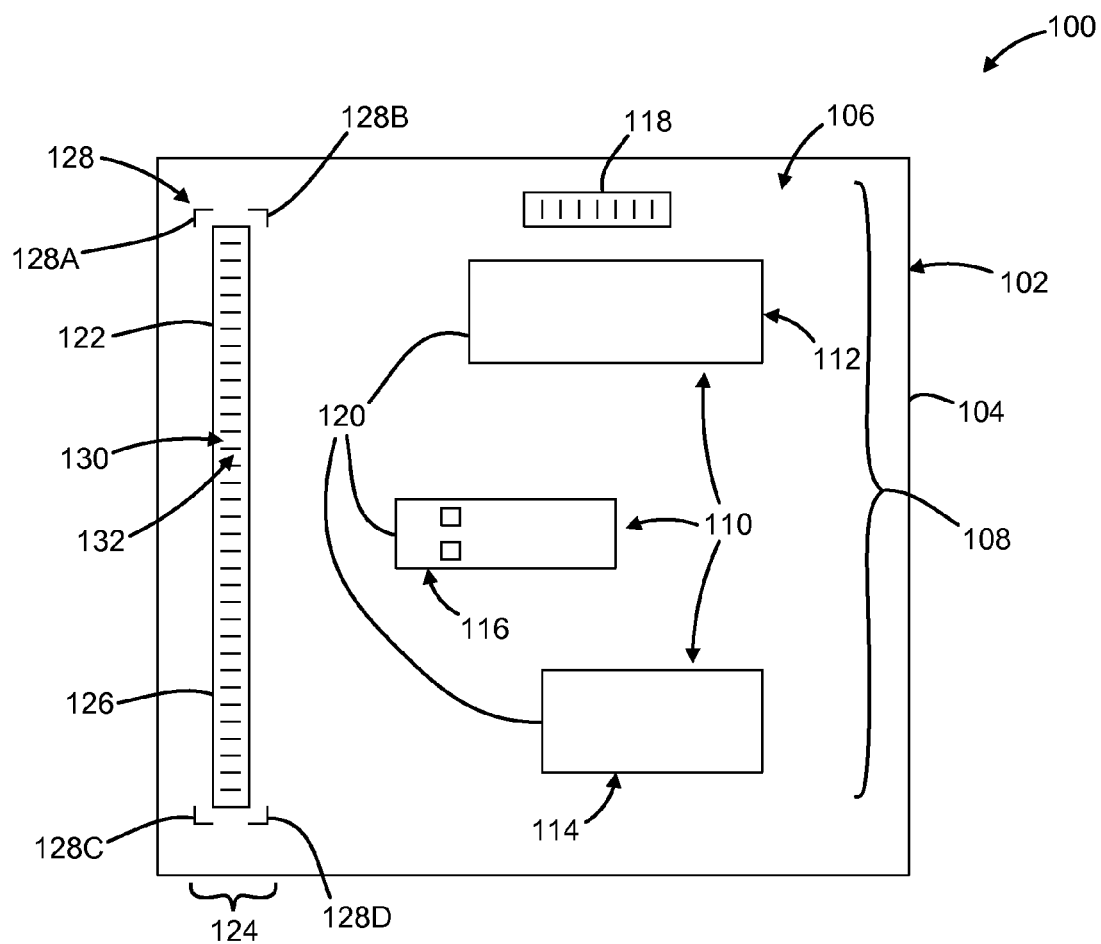
FIG. 1 is a schematic diagram of a document with features consistent with concepts of the present disclosure.

To further understand these concepts, and referring now to FIG. 1, there is provided an example of a document 100 with features that are made in accordance with concepts of the present invention. As depicted in FIG. 1, the document 100 can have a structure 102 with boundary features 104 and a content area 106 defined at least to some extent by the boundary features 104. Inside the content area 106 there is document content 108 such as text associated with the subject matter of a form (e.g., an IRS form). The document content 108 can be configured into one or more content fields 110 such as a text field 112, a signature field 114, a check box field 116, and a content barcode 118, wherein the content of each being particularly identified so as to facilitate processing of the document 100 as discussed in more detail below. Each of the content fields 110 can include a content field boundary 120 such as the rectangular boxes of the present example which delineate particular portions of the document content 108.

The document 100 can also include one or more form barcodes, generally identified by the numeral 122. The form barcode 122 can be a barcode or other decodable indicia in which there is embedded information respecting the document content 108. The form barcode 122 can have a form factor 124 identified by a form barcode boundary 126. In one example, the form barcode boundary 126 can include corners 128 and, for purposes of the illustrative example discussed below, the corners 128 include corners 128A, 128B, 128C, 128D. The form barcode 122 can also include a reference 130 such as at least one reference point 132, relative to which can be identified the position of the content fields 110. Noted herein is that while the reference 130, and the reference point 132 in particular, are illustrated and discussed as unique portions of the form barcode 122, these features can also be associated with the form barcode boundary 126, the corners 128, or any other parts of the document 100 which can provide basis for identification of the content fields 110.

The relationship between the content fields 110 and the form barcode 122 can be used to facilitate processing of the document 100. The inventors have determined that this relationship can to the extent devised provide for quick locating of the content fields 110 before any detailed analysis of image data is required. By avoiding these involved analysis and processing steps, or in one embodiment by simply searching for and decoding the form barcode 122, embodiments of the present invention can be used to improve throughput of document processing systems.

In one embodiment, the form barcode 122 has encoded therein contents such as a form structure. The form structure can be used to identify data and information about the form design such as, for example, the location of the content fields 110, the information in the content fields 110, the location of other form barcodes, and the like. In one example, the content is a form ID. Such form ID can be used to identify an entry in one or more tables or databases. This entry can include information about the form design, thereby providing ready access to such information before full processing of the captured image of the document 100 is required. In another example, the contents includes information about the relationships between the content fields 110, as well as the relationship between the content fields 110, the form barcode 122, and other parts of the document 100.

Relationships between the content fields 110 and the form barcode 122 can be characterized by the relative position of the content fields 110 with respect to the reference 130 such as with respect to the reference point 132. This characterization can be provided in various ways, some of which may rely on the system level concepts, constructions, and executable instructions provided to implement the concepts disclosed herein. By way of example, Cartesian and polar coordinate systems can be used to identify the location of each of the reference 130 (e.g., the reference point 132) and a portion of the content fields 110 such as a portion of the content field boundary 120. These coordinate systems can be used to establish offsets and distances such as between various locations within the content area 106, and more particularly as these offsets can be used to characterize the relationship between the content fields 110 and the form barcode 122.

The form barcode 122 can be particularly identified so as to facilitate its identification during processing of the captured image of the document 100. As depicted in FIG. 1, the form barcode 122 can be located along one or more edges of the document 100, or otherwise in positions that do not interfere with the document content 108. Examples of suitable positions can also locate one or more of the form barcode 122 in the margins of the document 100, along one or more edges of the document 100, and embedded within the content area 106 of the document 100. These positions can also be selected to facilitate decoding of the form barcode 122 in the primary or pre-processing stages of image analysis.

In addition to the particular location of the form barcode 122, the configuration of the form barcode 122 can also be used to identify and distinguish it from other portions of the document 100. Some of these configurations can be described by the form factor 124, which describes any one of the size, shape, color, and other physical characteristics that can promote decoding of the information in the form barcode 122 with minimal processing capability. In one example, the form barcode 122 is distinguished from the surrounding areas of the document 100 by way of its printing material (e.g., ultraviolet inks, infrared inks, and the like). In another example, the form barcode 122 is provided on the document 100 in a shape that distinguishes it from other parts of the document 100. In yet another example, the form barcode 122 is located on the document 100 in a pre-selected area or using pre-selected coordinates or in a pre-designated portion of the document 100. In still another example, the form barcode 122 can contain a bar code indicator such as a pre-assigned geometric pattern and/or be of the type that is anew or specially-designed symbology, any one of which is distinguishable from other barcodes and symbologies contemplated herein.

The features of the form barcode 122 can be used to quickly and accurately locate and decode the form barcode 122 in which is stored the information about the document 100. Such decoding would occur during initial, primary, or pre-processing stages of image analysis of the document 100. Thus in one embodiment the form factor 124 should be of the type that permits such identification to occur. For example, the form factor 124 should large enough to be easily detected such as can be selected to permit decoding to occur at the initial or raw data stage, i.e., before detailed analysis and processing of the document 100. The form factor 124 should also be large enough to represent the scale and positions of the content fields 110 such as would be used to establish a document coordinate system for the document 100.

In one embodiment, the coordinate system for the document 100 can have incorporated therein the origin for the Cartesian and/or polar coordinate systems mentioned above. The form factor 124 should still be sized to allow the rest of the document content 108 to be assigned positions, sizes, shapes, and related characteristics with sufficient resolution to permit decoding of the information found therein. In one example, and similar to what is depicted in FIG. 1, the form barcode 122 can extend along at least about 60% of the longest side of the document 100. This coverage can occur unitarily by way of one of form barcode 122 (see FIG. 1), or as several ones of form barcode 122, wherein the form factor 124 is smaller in size and dispersed and affixed at different positions in the content area 106 and/or the document 100 in general.

The content fields 110 can be used to identify and/or delineate portions of the document content 108. The content field boundary 120 such as the boxes of the present example in FIG. 1 can be automatically generated by executable instructions provided for purposes of processing the document 100, or in another example the content field boundary 120 can be identified and generated by users of the document 100 via, e.g., a suitable user interface or graphic user interface (GUI). Particular to the content fields 110 of the present example, the text field 112 can identify certain pertinent text or other information of the document 100 that may, for example, be necessary for ascertaining the content of the document 100. This text may include titles, identification numbers, page numbers, etc. Similarly the signature field 114 can be used to selectively identify areas of the document 100 in which there are expected signatures, stamps, fingerprints, and other personal identification information provided by, and/or solicited from, e.g., a user of the document 100. Examples of information identified by the check box field 116 can include the number of check boxes, the orientation and location of the check boxes, the collected information (e.g., the answers from the user of the document 100) indicated by each of the check boxes, and the like. In one embodiment, the content barcode 118 has encoded therein, using any one or more of the variety of symbologies discussed and contemplated throughout, information pertinent to the document. Information in one or more of the content fields 110 can be coded into the form barcode 122, and in one particular implementation the initial processing of the captured document image data can read and decode this information before processing other pieces of the captured document image data.

Figure 2:
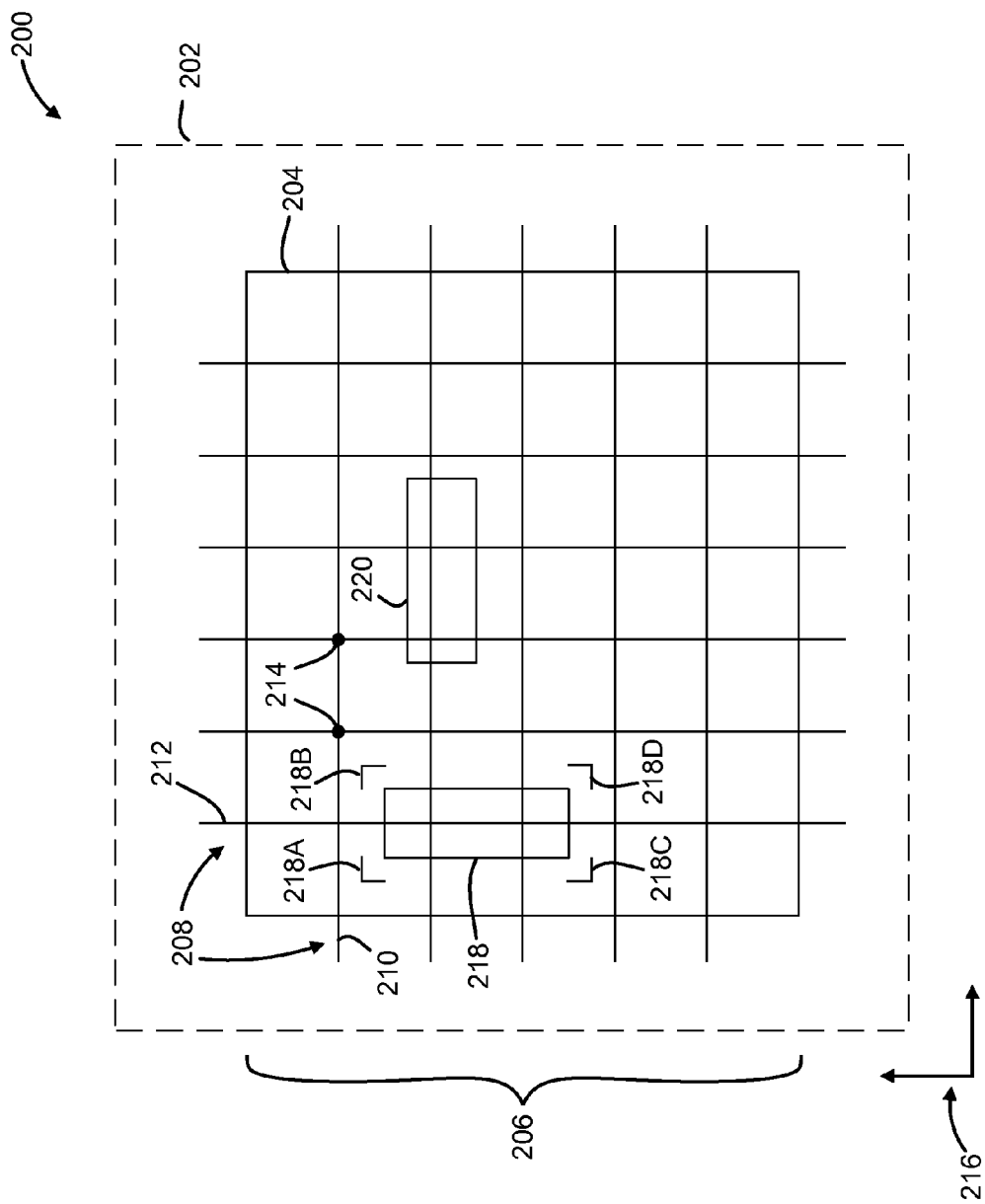
FIG. 2 is a schematic diagram of an image plane of the document of FIG. 1.

With continued reference to FIG. 1, and also now to FIG. 2, one example of the identification of the location of the content fields 110 (FIG. 1) by way of the form barcode 122 (FIG. 1) is described. FIG. 2 illustrates an example of an image 200 of, e.g., the document 100, captured using imaging and imaging technology contemplated and described herein. The image 200 includes an image plane 202 with an image boundary 204, in which there is found an image grid 206. The image grid 206 can include a plurality of image grid lines 208 such as the horizontal grid lines 210 and vertical grid lines 212 that intersect at grid points 214, as depicted in the present example. The image grid 206 is overlaid on the image plane 202, representing infinite imaginary lines that establish a coordinate system 216 for use in identifying and locating the relative position of the content fields 110 in the document 100. The image 200 also includes an indicia representation 218 with corners 218A, 218B, 218C, and 218D, and one or more content field representations 220, all of which are representative of corresponding features that are found on the physical manifestation of, e.g., the document 100. The indicia representation 218 is for example representative of the form barcode 122 (FIG. 1).

The image boundary 204 can include the entire contents of the document 100 (FIG. 1), or in other examples the image boundary 204 is representative of only a portion of the document 100 (FIG. 1). Configurations of the inventive concepts of the present disclosure are compatible with various sizes and shapes of the image boundary 204. It will be appreciated that it is useful to use various scaling factors, orientation factors, and other factors to determine the relative sizes, shapes, of the image boundary 204 as well as to interpolate that size and shape to the relative portions of the document 100 (FIG. 1) that are captured during decoding of the form barcode 122 (FIG. 1).

In one embodiment, to characterize the relative location of content field 110 (FIG. 1) in the document 100 (FIG. 1) by way of the form barcode 122 (FIG. 1), the corners 218A, 218B, 218C, and 218D can be used to identify the image plane 202 and to establish the coordinate system 216. Because the present disclosure is primarily for use with imaging and relating imaging devices, calculations and algorithms can be used to correlate pixel locations with the coordinate system 216 and more particularly to establish the location of the horizontal 210 and vertical 212 grid lines, as well as the grid points 214 established therein. Details of concepts that can be applied for use in developing and processing image data such as to identify and characterize the image grid 206 is found in U.S. Pat. No. 6,561,428 to Meier et al., the contents of which is incorporated by reference in its entirety herein.

Consistent with the processing of image data, information about the location and position of the content fields 110 (FIG. 1) relative to one or more of the reference point 132 (FIG. 1) can translate into coordinate positions for each of the content field representations 220. These coordinate positions can reflect one or more of the grid points 214, horizontal and vertical locations identified via the horizontal 210 and vertical 212 grid lines 208, or other combination of points and lines found within the image plane 202. In one embodiment, decoding of the form barcode 122 (FIG. 1) is effective at providing both the layout for the image grid 206 (e.g., the layout and location of the image grid lines 208 and the grid points 214, as well as the relative location of the content fields 110 as represented by the content field representations 220. Thus in such exemplary construction, processing of the document 100 (FIG. 1) is effectuate simply by decoding the form barcode 122 (FIG. 1).

Figure 3:
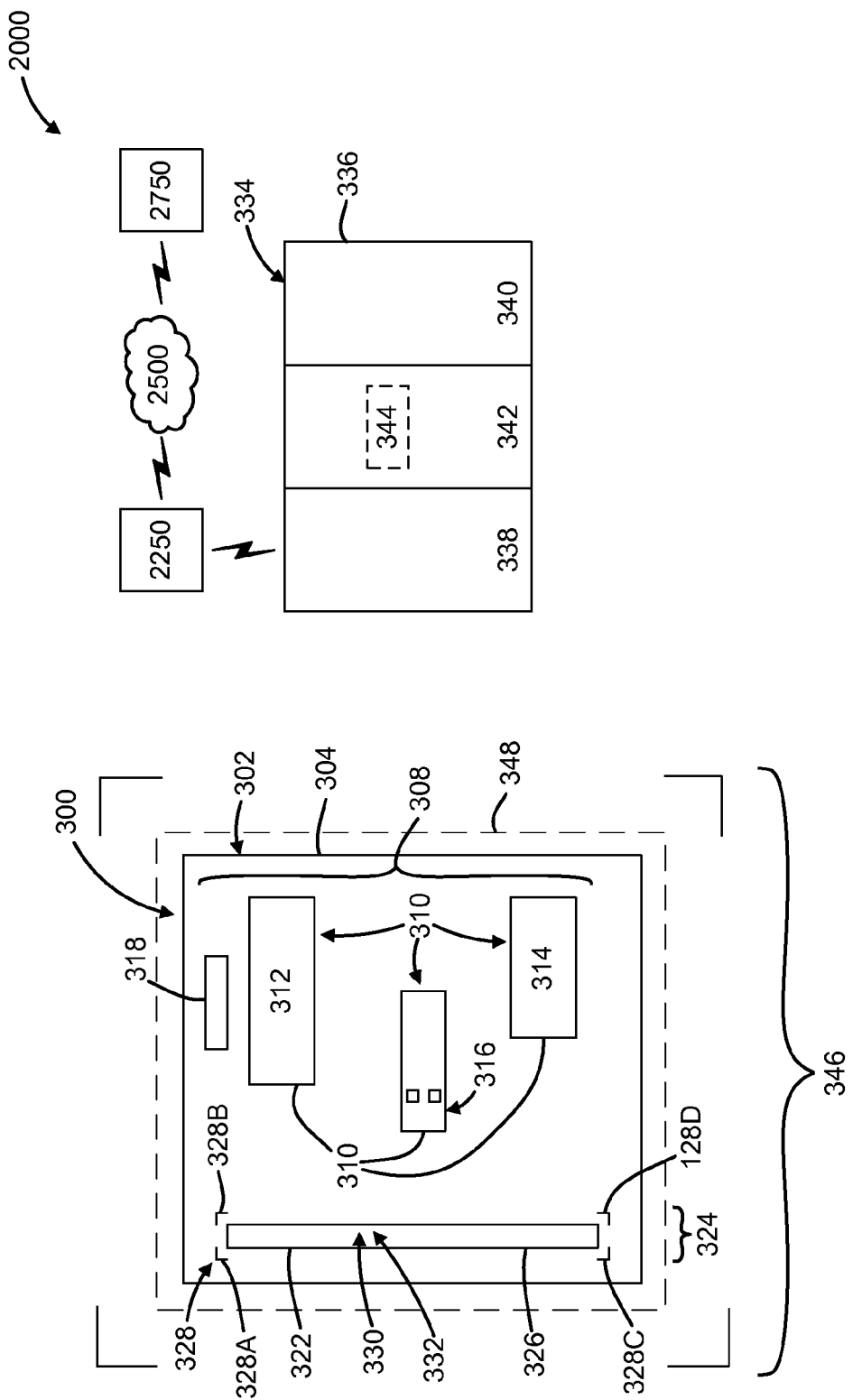
FIG. 3 is a schematic diagram of an exemplary indicia reading terminal.

Implementation of the concepts discussed in connection with the document 100 above can be further understood with reference to the exemplary document 300 and related system level information shown in FIG. 3. In addition to the document 300 and its related features (wherein like numerals are used to identify like components as between the document 100 and the document 300) there is depicted in FIG. 3 a schematic diagram of an exemplary indicia reading terminal 334. The indicia reading terminal 334 can comprise a device structure 336 with an imaging module 338, a processing module 340 such as a central processing unit ("CPU"), and a storage module 342 such as memory that has at least one zone 344 for, e.g., storing certain contents about the document 300. In one embodiment, the indicia reading terminal 334 can be operatively configured with a field of view 346 established by, e.g., the imaging module 338. The field of view 346 can be sized to capture a document image 348 respecting the document 300. There are other components and hardware that can facilitate the capture of the document image data, some of which are discussed in more detail in connection with the indicia reading terminals illustrated in FIGS. 8-11 and described below.

The indicia reading terminal 336 can be part of a system 2000 having a local server 2250, a remote server 2750, and a network 2500 that couples the local server 2250 and the remote server 2750. This configuration of the system 2000 can be utilized for processing the captured document image data, and in one configuration one or more of the local server 2250 and the remote server 2750 is utilized to entirely process the captured document image data in a manner consistent with the disclosure below. In one embodiment, one or more of the processing module 340 and the storage module 342, or complementary ones thereof, can be located outside of the indicia reading terminal 336 so as to permit data and information captured by the indicia reading terminal 336 to be transferred from the indicia reading terminal 336 to, e.g., the corresponding storage module 342 for immediate and/or further processing of the captured document image data. In another embodiment, image processing steps disclosed, described, and contemplated herein can be distributed as between the indicia reading terminal 336, the local server 2250, and the remote server 2750, with still other embodiments being configured for the image processing steps to be executed entirely by the indicia reading terminal 336.

Symbology, coding, and other aspects of the form barcode 322 and the content barcode 318, may be selected in accordance with configuration and capabilities of the processing module 340. In one embodiment, the processing module 340 can be any type of CPU or microprocessor with exemplary functions designed to decode machine readable types of symbology, and particularly in connection with symbology found in the captured document image data. Decoding is a term used to describe the successful interpretation of machine readable indicia contained in an image captured by the imaging module 338. The code has data or information encoded therein. Information respecting various reference decode algorithms are available from various published standards, such as by the International Standards Organization ("ISO"). Examples may comprise one dimensional (or linear) symbologies, stacked symbologies, matrix symbologies, Composite symbologies, or other machine readable indicia. One dimensional (or linear) symbologies which may include very large to ultra-small, Code 128, Interleaved 2 of 5, Codabar, Code 93, Code 11, Code 39, UPC, EAN, MSI, or other linear symbologies. Stacked symbologies may include PDF, Code 16K, Code 49 or other stacked symbologies. Matrix symbologies may include Aztec, Datamatrix, Maxicode, QR Code or other 2D symbologies. Composite symbologies may include linear symbologies combined with stacked symbologies. Other symbology examples may comprise OCR-A, OCR-B, MICR types of symbologies. UPC/EAN symbology or barcodes are standardly used to mark retail products throughout North America, Europe and several other countries throughout the world.

Figure 4:
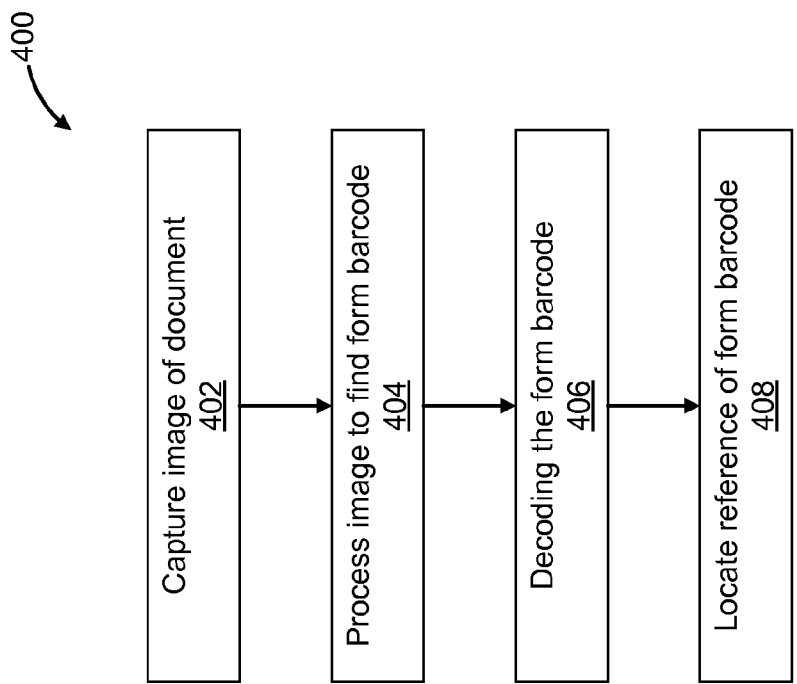
FIG. 4 is a flow diagram of one example of a method for processing a document, such as the document of FIG. 1, utilizing a decodable indicia affixed to the document.

With continued reference to FIG. 3, and also now to FIG. 4, there is illustrated an exemplary embodiment of a method 400 for processing a document (e.g., the document 300). The method 400 includes, at block 402, capturing an image of the document and, at block 404, processing the document image to identify a form barcode disposed on the document. The method 400 also includes, at block 406, decoding the form barcode, thereby retrieving the information embedded therein. In one embodiment, the method can further include, at block 408, locating other parts of the document including, for example, a reference of the form barcode, a coordinate system, and/or one or more content fields. In one example, the reference comprises one or more points or other features of the document as was discussed above.

Execution of the method 400 and similar embodiments is useful to reduce processing time of the document image. The processing at block 404, for example, can be done on raw or relatively low-resolution captured image data to pick-up and identify the form barcode from among the background noise of the document image. This feature reduces the need for high-level processing techniques. Moreover, in one embodiment the processing requirements may be further reduced when the information respecting the content of the document is encoded in a low density bar code that extends substantially along the length of, e.g., an 8.5 in×11 in document.

By identifying the form barcode from among the content of the document it is possible to discern other information about the document without having to fully process the document image. In one example, the form barcode can have encoded therein information about the content such as the relative position of the content fields with respect to the form barcode. This relative position can be given in terms of coordinates and/or offsets, with the origin of these coordinates being provided by the reference associated with the form barcode. As discussed above, these coordinates can originate from a document coordinate system in which the origin, scale, and orientation of the document coordinate system can be built based on the positions of the reference points in the document image. When embodiments of the method 400 identify the reference, such as a single reference point of the form barcode, then the position of the content field can be located without further processing of the image to look for specific identifying characteristics of the respective content field.

Figure 5:
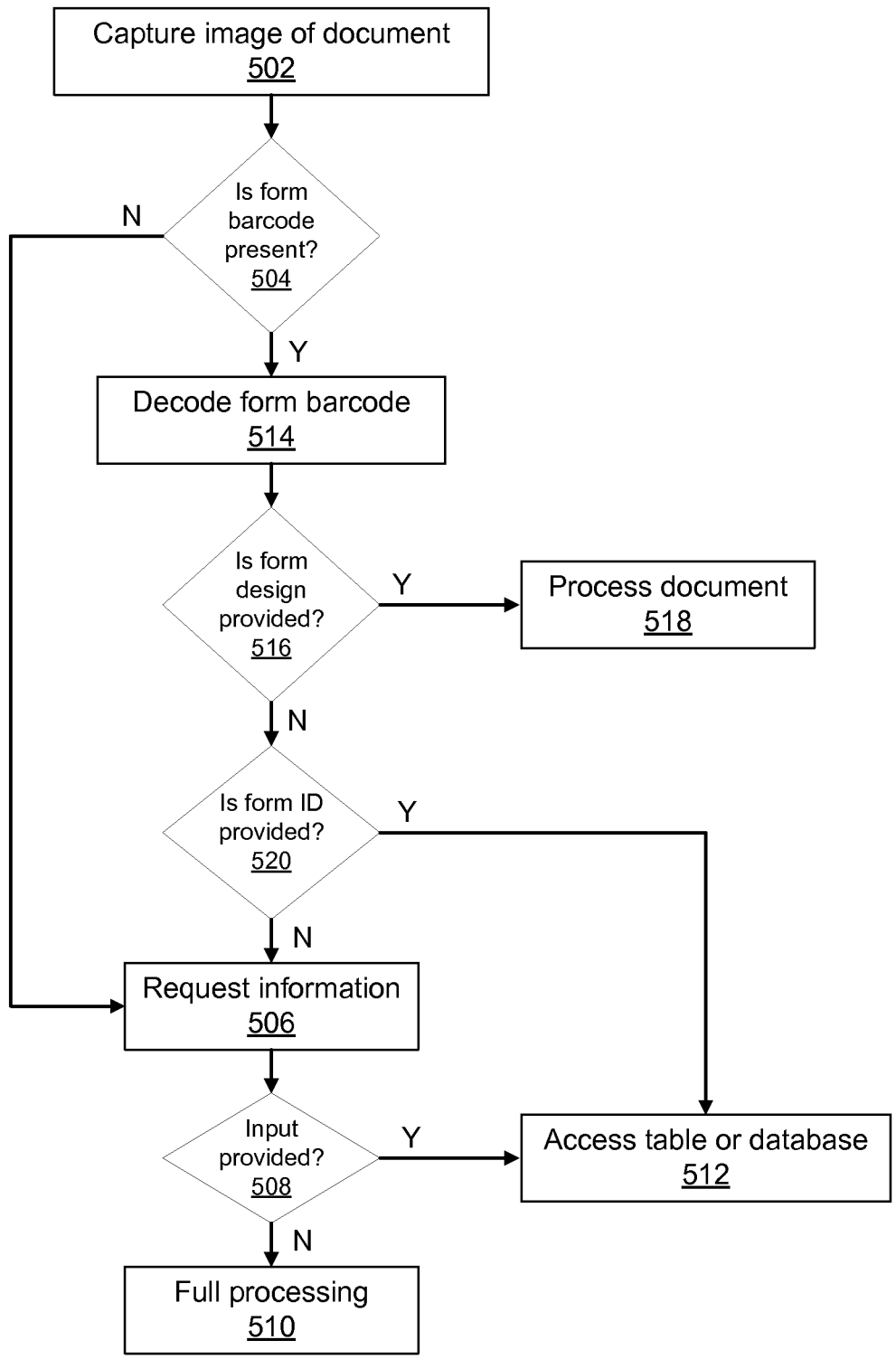
FIG. 5 is a flow diagram of another example of a method for processing a document, such as the document of FIG. 1, utilizing a decodable indicia affixed to the document.

Another exemplary embodiment of a method 500 is illustrated in FIG. 5. In one embodiment, the method 500 include, at block 502, capturing an image of the document, at block 504, determining whether a form barcode is present in the captured image of the document. If the form barcode is not present (or not identified in the captured image), then the method 500 can also include, at block 506, requesting information such as from an end user or operator of the indicia reading terminal device and, at block 508, determining whether the input is provided such as whether the input is a form ID. If no entry is provide by the end user via, e.g., manual entry, than the method 500 can continue with block 510, continuing to fully processes the captured image data. However, if the form ID or other identified information is provided, then the method 500 includes at block 512, finding an entry based on the information in a table and/or database. The requested information can include, for example, the form ID which is used to identify the entry in the table or the database. Such entry can include a variety of information about the document such as the location (e.g., coordinates) of the content fields. This information is useful because full processing of the document is not required as the information provides information of the relevant or pre-selected fields that are or may be pertinent to the particular document that has been imaged.

When the form barcode is present and identified, the method further includes, at block 514, decoding the form barcode and, at block 516, determining whether there is encoded in the form barcode information such as about the form design and/or form design data. This information can be all relevant information necessary to process the document, thereby saving time and processing resources. For example, if there is information respecting the form design and related data in the form barcode, then the method can include at block 518, processing the document using the data that is encoded in the form barcode. On the other hand, if there is no form design or form design data found in the form barcode, then them method 500 can include, at block 520, determining whether the form ID is provided. Again, if the form ID is found, then the method 500 use the form ID to retrieve information from a table or a database (e.g., at block 512). In one embodiment, the method 500 can continue to request the input from the end user (e.g., at block 506) and execute the remaining processing steps as depicted in FIG. 5.

Embodiments of the method 400 and the method 500 are useful, for example, when only information about the structure is encoded in the form barcode. This information can be used to access other information such as information stored in a table, database, or other repository. The stored information may provide additional details about the content of the document. In one example, the information in the repository is derived from pre-processed documents such as those previously under processes and protocols of the type disclosed herein. The derived information may be stored, indexed, and made available to speed up processing as between one or more documents such as a first document and a second document, both of which include a form barcode of the same or similar type and/or a form structure of the same or similar construction.

Figure 6:
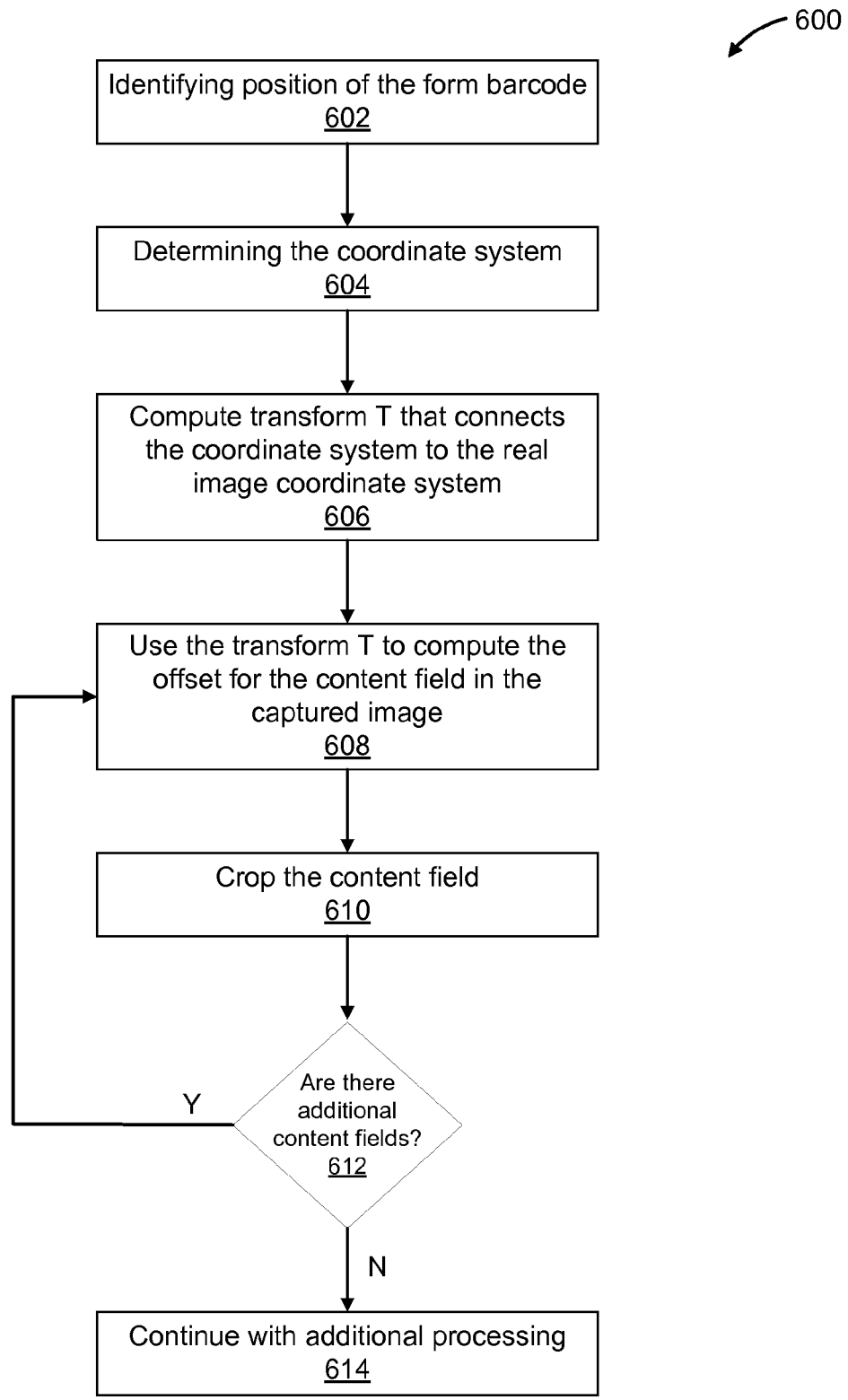
FIG. 6 is a flow diagram of yet another example of a method for processing a document, such as the document of FIG. 1, utilizing a decodable indicia affixed to the document.

With continued reference to FIG. 5, and also now to FIG. 6, attention is focused on the processing of the captured image data using the form design and form design data as would occur in, e.g., block 518 of FIG. 5 and mentioned above. A sample of the processing steps useful for such processing are provided in the example of a method 600 of processing using the form design and form design data. In one embodiment, the method 600 includes at block 602 identifying the position of the form barcode in the captured image of the document and at block 604 determining a coordinate system based on the position of the form barcode. The method 600 also includes at block 606 computing a transform T that connects the coordinate system to the real image coordinate system. In one example, this computation can utilize the correspondence between the form barcode position and the real image barcode position.

In one embodiment, for each of the content fields of the document such as those content fields identified in the form barcode, by way of the form ID, and/or in the form design and form design data, the method 600 also includes at block 608 computing the real offset in the captured image of the content field based on the transform T. The method 600 can also include at block 610 cropping the content field from the captured image using the computed offsets. In one example, the computed offsets save processing time by identifying with particularity the location and position of the content field, thereby directing and/or instructing the processing algorithm (and circuitry) to the correct location. Cropping about the content field can likewise include executed steps, blocks, and instructions, which in broad terms are useful to focus the processing on the particular area of the captured image in which is located the content field of interest.

The method 600 can further include at block 612 determining whether additional content fields are present, as per for example the information encoded in the form barcode or otherwise made available, e.g., as being stored in memory. If additional content fields are to be processed, then the method 600 can in one embodiment return to block 608 and/or 610 and continue processing the document. On the other hand, if no additional content fields or all content fields have been processed, then the method can include block 614 continuing additional processing of the document.

Embodiments of the method 500 and the method 600 can be implemented by systems (e.g., document management systems) that are configured to accommodate variance as between the documents that are scanned. Often these systems can employ cameras, hand held scanners, and the like to capture image data of the documents. Variance can occur in the shape of the document, and more particularly the shape of the captured image. In on example, the calculation and determination of the transform T permits such systems to compute the real position of any designated position such as by using the known aspects of the form barcode (e.g., the location and/or position of the corners of the form barcode).

Moreover, it is also contemplated that one or more of the blocks of the method 500 and the method 600 can be implemented together. Coordination of these blocks can widen the scope of applications, thereby rendering a robust document management system that can processes many different types of documents using the form barcode and the information encoded in the form barcode. In one example, the information from the form barcode (e.g., the output of block 514, decoding the form barcode) can be provided to block 602. In another example, the information about the document (e.g., the output of block 518, processing the document) can be provided to block 606. In yet another example, the information about the form design and/or the form structure (e.g., the input solicited at block 516) can be provided to block 608.

Figure 7:
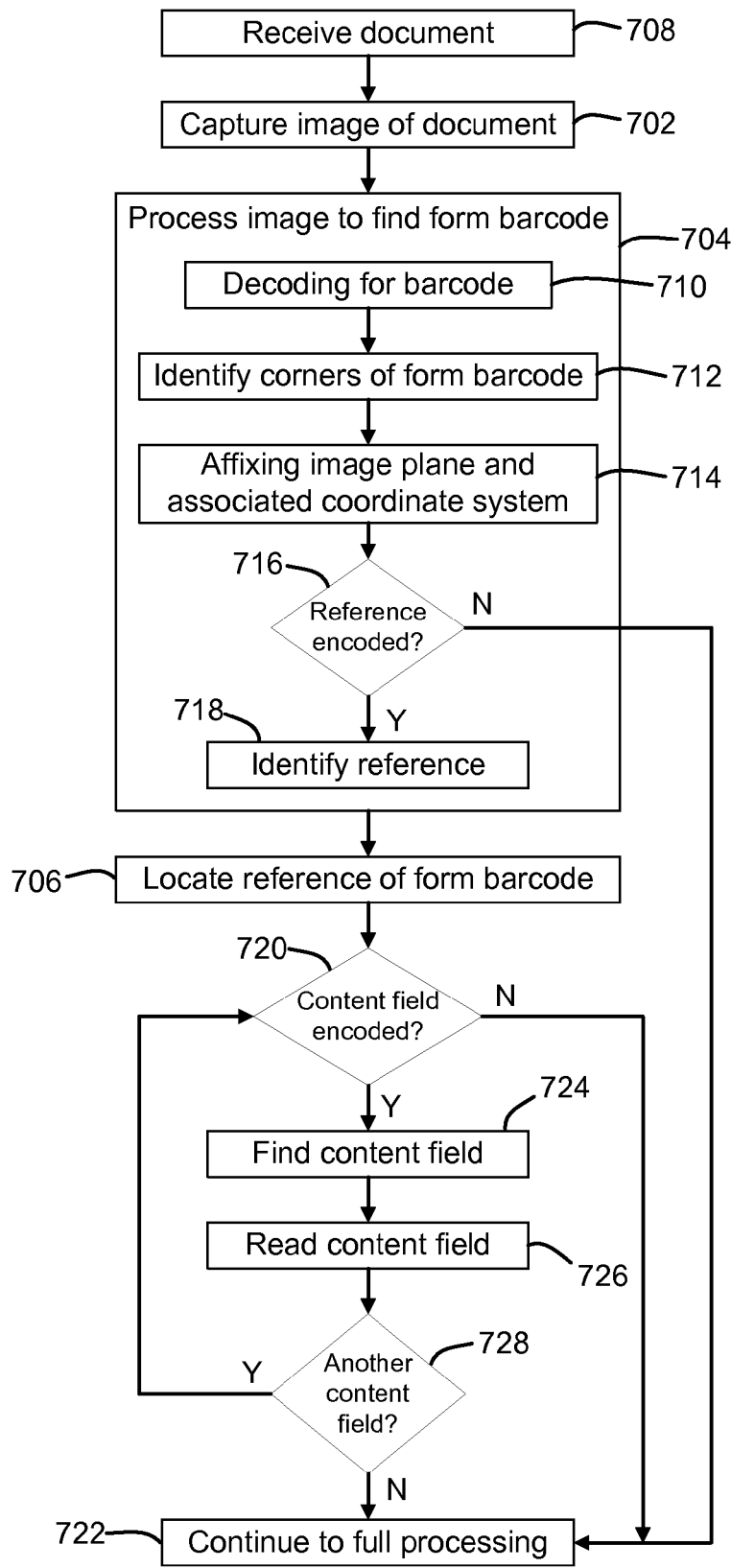
FIG. 7 is a flow diagram of still yet another example of a method for processing a document, such as the document of FIG. 1, utilizing a decodable indicia affixed to the document.

Expanding on the concepts of the present invention reference can now be had to the exemplary embodiment of a method 700 that is depicted in FIG. 7. In this example, the method 700 includes a block 702 for capturing an image of a document, a block 704 for processing the document image for finding a form barcode, and a block 706 for locating a reference of the form barcode on the document. The method 700 also includes, at block 708, receiving the document such as by automated document handling that can manipulate bulk forms and can be related to bulk-type form processing systems. The method also includes a block 710 decoding the form barcode, at block 712 identifying the corners of the form barcode, and at block 714, affixing the image plane and associated coordinate system such as based on the corners of the form barcode. The method further includes at block 716 determining if the reference (and its location) are encoded, and at block 718 identifying the reference by, e.g., using the location encoded in the form barcode. The method further includes at block 720 determining if a content field is encoded in the form barcode. If there are no content fields encoded, then the method 700 can include at block 722 continuing to fully process the document image such as to identify the content fields without use or reference relative to the form barcode.

When one or more content fields are found such as by encoded locations and/or coordinates of the content field in the form barcode, the method 700 can include at block 724 finding the content field relative to the reference using, e.g., the coordinates. The method 700 can also include at block 726 reading the information of the found content field, and at block 728 determining if another content field is to be located. If no other content fields are designated as required or necessary for processing of the document, then the method 700 can continue to the block 722 for full processing of the document image. On the other hand, if other content fields are designated, then the method 700 can continue to block 720 to determine if the new content field is encoded in the form barcode.

Embodiments of the method 700 are suitable for implementation in connection with a system (e.g., document management systems) wherein there is little variance from document-to-document. In one example, the method 700 is implemented in connection with documents that have the same or substantially similar size and shape (e.g., all of rectangular profile with the same dimensions as the original document). The method 700 can utilize offset data such as data that relates the position of the content fields to the form barcode. In one example, cropping can occur by way of this offset data.

Further details of indicia reading terminals such as the indicia reading terminal 334 of FIG. 3 are illustrated in FIGS. 8-11 and discussed in more detail below. There is provided in FIGS. 8 and 9, and described in more detail below, an example of an imaging module 800 for use as, e.g., the imaging module 338 (FIG. 2). In one embodiment of the indicia reading terminal 334, the imaging module 800 can comprise a focus element 802, and an image sensor integrated circuit 804 that is disposed on a printed circuit board 806 together with an illumination pattern light source bank 808 ("the illumination bank"), and aiming pattern light source bank 810 ("the aiming bank"). Here, each of the illumination bank 808, and the aiming bank 810 is provided as a single light source. The imaging module 800 can also include an optical plate 812 that has optics for shaping light from illumination bank 808, and the aiming bank 810 into predetermined patterns.

Imaging module 800 can be disposed in the indicia reading terminals such as the indicia reading terminal 334 (FIG. 2) and the exemplary embodiment of an indicia reading terminal 900, which is shown in FIG. 10. The indicia reading terminal 900 can include a hand held housing 902 that supports a user input interface 904 with a pointer controller 906, a keyboard 908, a touch panel 910, and a trigger 912. The hand held housing 902 can also support a user output interface 914 with a display 916.

Exemplary devices that can be used for devices of the user input interface 904 are generally discussed immediately below. Each of these is implemented as part of, and often integrated into the hand held housing 902 so as to permit an operator to input one or more operator initiated commands. These commands may specify, and/or activate certain functions of the indicia reading terminal. They may also initiate certain ones of the applications, drivers, and other executable instructions so as to cause the indicia reading terminal 900 to operate in an operating mode.

Devices that are used for the point controller 906 are generally configured so as to translate the operator initiated command into motion of a virtual pointer provided by a graphical user interface ("GUI") of the operating system of the indicia reading terminal 900. It can include devices such as a thumbwheel, a roller ball, and a touch pad. In some other configurations, the devices may also include a mouse, or other auxiliary device that is connected to the indicia reading terminal 900 by way of, e.g., via wire or wireless communication technology.

Implementation of the keyboard 908 can be provided using one or more buttons, which are presented to the operator on the hand held housing 902. The touch panel 910 may supplement, or replace the buttons of the keyboard 908. For example, one of the GUIs of the operating system may be configured to provide one or more virtual icons for display on, e.g., the display 916, or as part of another display device on, or connected to the indicia reading terminal 900. Such virtual icons (e.g., buttons, and slide bars) are configured so that the operator can select them, e.g., by pressing or selecting the virtual icon with a stylus (not shown) or a finger (not shown).

The virtual icons can also be used to implement the trigger 912. On the other hand, other devices for use as the trigger 912 may be supported within, or as part of the hand held housing 902. These include, but are not limited to, a button, a switch, or a similar type of actionable hardware that can be incorporated into the embodiments of the indicia reading terminal 900. These can be used to activate one or more of the devices of the portable data terminal, such as the bar code reader discussed below.

Displays of the type suited for use on the indicia reading terminal 900 are generally configured to display images, data, and GUIs associated with the operating system and/or software (and related applications) of the indicia reading terminal 900. The displays can include, but are not limited to, LCD displays, plasma displays, LED displays, among many others and combinations thereof. Although preferred construction of the indicia reading terminal 900 will include devices that display data (e.g., images, and text) in color, the display that is selected for the display 916 may also display this data in monochrome (e.g., grayscale). It may also be desirable that the display 916 is configured to display the GUI, and in particular configurations of the indicia reading terminal 900 that display 916 may have an associated interactive overlay, like a touch screen overlay on touch panel 910. This permits the display 916 to be used as part the GUI so as to permit the operator to interact with the virtual icons, the buttons, and other implements of the GUI to initiate the operator initiated commands, e.g., by pressing on the display 916 and/or the touch panel 910 with the stylus (not shown) or finger (not shown).

The hand held housing 902 can be constructed so that it has a form, or "form factor" that can accommodate some, or all of the hardware and devices mentioned above, and discussed below. The form factor defines the overall configuration of the hand held housing 902. Suitable form factors that can be used for the hand held housing 902 include, but are not limited to, cell phones, mobile telephones, personal digital assistants ("PDA"), as well as other form factors that are sized and shaped to be held, cradled, and supported by the operator, e.g., in the operator's hand(s) as a gun-shaped device. One exemplary form factor is illustrated in the embodiment of the indicia reading terminal 900 that is illustrated in the present FIG. 8.

Figure 11:
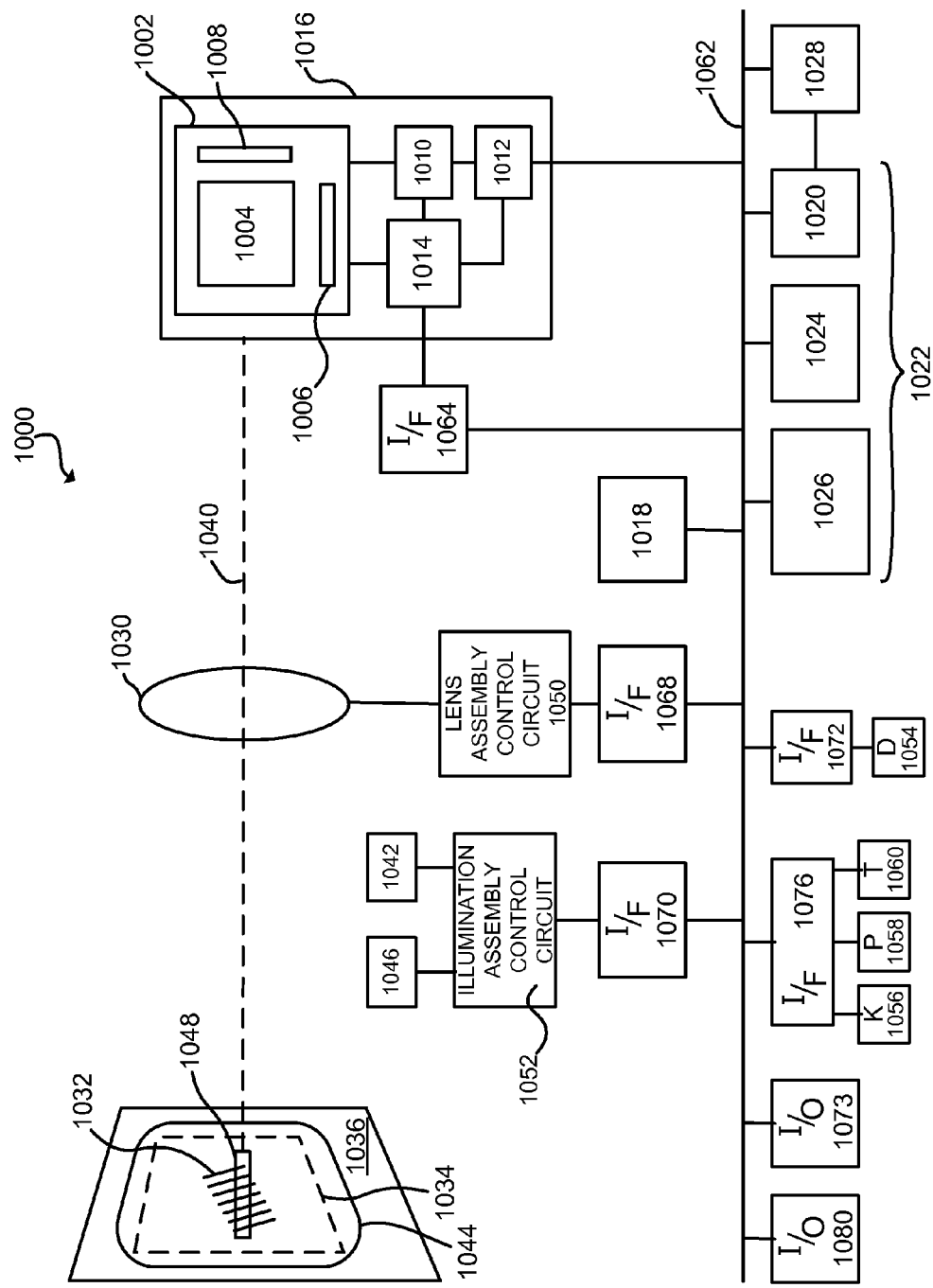
FIG. 11 is a block diagram of an exemplary hardware platform for implementation in an indicia reading terminal such as the indicia reading terminal of FIGS. 3 and 10.

An exemplary hardware platform for use in, e.g., the indicia reading terminal 334 and 900, is illustrated and described with reference to the schematic block diagram of FIG. 11. In FIG. 11, it is seen that an indicia reading terminal 1000 ("the terminal") can include an image sensor 1002 comprising a multiple pixel image sensor array 1004 ("the image sensor array") having pixels arranged in rows and columns of pixels, including column circuitry 1006 and row circuitry 1008. Associated with the image sensor 1002 can be amplifier circuitry 1010, and an analog to digital converter 1012 which converts image information in the form of analog signals read out of image sensor array 1004 into image information in the form of digital signals. Image sensor 1002 can also have an associated timing and control circuit 1014 for use in controlling, e.g., the exposure period of image sensor 1002, and/or gain applied to the amplifier 1010. The noted circuit components 1002, 1010, 1012, and 1014 can be packaged into an image sensor integrated circuit 1016. In one example, image sensor integrated circuit 1016 can be provided by an MT9V022 image sensor integrated circuit available from Micron Technology, Inc. In another example, image sensor integrated circuit 1016 can incorporate a Bayer pattern filter. In such an embodiment, CPU 1018 prior to subjecting a frame to further processing can interpolate pixel values intermediate of green pixel values for development of a monochrome frame of image data. In other embodiments, red, and/or blue pixel values can be utilized for the monochrome image data.

In the course of operation of terminal 1000 image signals can be read out of image sensor 1002, converted and stored into a system memory such as RAM 1020. A memory 1022 of terminal 1000 can include RAM 1020, a nonvolatile memory such as EPROM 1024, and a storage memory device 1026 such as may be provided by a flash memory or a hard drive memory. In one embodiment, terminal 1000 can include CPU 1018 which can be adapted to read out image data stored in memory 1022 and subject such image data to various image processing algorithms. Terminal 1000 can include a direct memory access unit (DMA) 1028 for routing image information read out from image sensor 1002 that has been subject to conversion to RAM 1020. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1002 and RAM 1020 are within the scope and the spirit of the invention.

Referring to further aspects of terminal 1000, terminal 1000 can include an imaging lens assembly 1030 for focusing an image of a form barcode 1032 located within a field of view 1034 on a substrate 1036 onto image sensor array 1004. Imaging light rays can be transmitted about an optical axis 1040. The imaging lens assembly 1030 can be adapted to be capable of multiple focal lengths and/or multiple best focus distances.

Terminal 1000 can also include an illumination pattern light source bank 1042 for generating an illumination pattern 1044 substantially corresponding to the field of view 1034 of terminal 1000, and an aiming pattern light source bank 1046 for generating an aiming pattern 1048 on substrate 1036. In use, terminal 1000 can be oriented by an operator with respect to a substrate 1036 bearing the form barcode 1032 in such manner that aiming pattern 1048 is projected on the form barcode 1032. In the example of FIG. 9, the form barcode 1032 is provided by a 1D bar code symbol. Form barcode could also be provided by 2D bar code symbols, stacked linears, or optical character recognition (OCR) characters, etc.

Each of illumination pattern light source bank 1042 and aiming pattern light source bank 1046 can include one or more light sources. The imaging lens assembly 1030 can be controlled with use of lens assembly control circuit 1050 and the illumination assembly comprising illumination pattern light source bank 1042 and aiming pattern light source bank 1046 can be controlled with use of illumination assembly control circuit 1052. Lens assembly control circuit 1050 can send signals to the imaging lens assembly 1030, e.g., for changing a focal length and/or a best focus distance of imaging lens assembly 1030. This can include for example providing a signal to the piezoelectric actuator to change the position of the variable position element of the focus element discussed above. Illumination assembly control circuit 1052 can send signals to illumination pattern light source bank 1042, e.g., for changing a level of illumination output by illumination pattern light source bank 1042.

Terminal 1000 can also include a number of peripheral devices such as display 1054 for displaying such information as image frames captured with use of terminal 1000, keyboard 1056, pointing device 1058, and trigger 1060 which may be used to make active signals for activating frame readout and/or certain decoding processes. Terminal 1000 can be adapted so that activation of trigger 1060 activates one such signal and initiates a decode attempt of the form barcode 1032.

Terminal 1000 can include various interface circuits for coupling several of the peripheral devices to system address/data bus (system bus) 1062, for communication with CPU 1018 also coupled to system bus 1062. Terminal 1000 can include interface circuit 1064 for coupling image sensor timing and control circuit 1014 to system bus 1062, interface circuit 1068 for coupling the lens assembly control circuit 1050 to system bus 1062, interface circuit 1070 for coupling the illumination assembly control circuit 1052 to system bus 1062, interface circuit 1072 for coupling the display 1054 to system bus 1062, and interface circuit 1076 for coupling the keyboard 1056, pointing device 1058, and trigger 1060 to system bus 1062.

In a further aspect, terminal 1000 can include one or more I/O interfaces 1073, 1080 for providing communication with external devices (e.g., a cash register server, a store server, an inventory facility server, a peer terminal, a local area network base station, a cellular base station, etc.). I/O interfaces 1073, 1080 can be interfaces of any combination of known computer interfaces, e.g., Ethernet (IEEE 802.3), USB, IEEE 802.11, Bluetooth, CDMA, GSM, IEEE 1394, RS232 or any other computer interface.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A system for processing a document comprising, an indicia reading terminal comprising a two dimensional image sensor array comprising a plurality of pixels extending along an image plane, an optical assembly for use in focusing imaging light rays onto the plurality of pixels of said two dimensional image sensor array, and a housing encapsulating the two dimensional image sensor array and the optical assembly,
wherein the system is operative in a mode in which the system, in response to an operator initiated command, captures a frame of image data and processes the frame of image data for attempting to decode a form barcode on the document,
wherein the system is further operative to identify a coordinate system on an image plane from information stored in the form barcode, wherein the system is yet further operative to identify relative to the form barcode and in the coordinate system the position of a content field located on the document,
wherein processing of the frame of image data on a first document having the form barcode disposed thereon is faster than processing of the frame of image data on a second document without the form barcode;
wherein the system is operative to identify at least one corner of the form barcode; and
wherein the coordinate system is located relative to the identified corner.

2. A system according to claim 1 wherein the system is operative to identify a form ID encoded in the form barcode, and wherein the form ID identifies an entry in a table.

3. A system according to claim 1 wherein the system is operative to locate and decode the form barcode before other content fields of the document.

4. A system according to claim 3 wherein the system is further operative to identify a pre-assigned geometric pattern encoded in the form barcode.

5. A system according to claim 1 wherein the system is operative to identify information in the content field from the form barcode.

6. A system according to claim 1 wherein the system is operative to locate at least one corner of the form barcode, wherein the system is operative to locate a reference on the form barcode relative to the at least one corner, and wherein the system is operative to locate the content field relative to the reference.

7. A system according to claim 1 wherein the system is operative to establish a grid having horizontal and vertical grid lines on the image plane, wherein the system is further operative to locate the content field on the grid, and wherein the grid is associated with the coordinate system.

8. A system for automatedly handling documents, said system comprising:
an indicia reading terminal comprising a two dimensional image sensor array comprising a plurality of pixels extending along an image plane, an optical assembly for use in focusing imaging light rays onto the plurality of pixels of said two dimensional image sensor array, and a housing encapsulating the two dimensional image sensor array and the optical assembly;
an external server in communication with the indicia reading terminal, the external server external to the indicia reading terminal;
wherein the system is operative in a mode in which the system, in response to an operator initiated command, captures a frame of image data and processes the frame of image data for attempting to decode a form barcode on the document, wherein the system is operative to form an image plan on which is located a grid respecting a coordinate system,
wherein the grid has grid points established from at least one corner of the form barcode, wherein the system is further operative to identify on the grid a content field with coordinates in the coordinate system that correspond to information encoded in the form barcode, and
wherein processing of the frame of image data on a first document having the form barcode disposed thereon is faster than processing of the frame of image data on a second document without the form barcode.

9. A method of processing a document comprising:
capturing a frame of image data corresponding to the document;
processing the frame of image data to locate a form barcode affixed to the document;
establishing a coordinate system on an image plane respecting the captured image data;
locating relative to the form barcode and on the coordinate system a content field on the document; and
locating at least one corner of the form barcode;
wherein processing of the frame of image data on a first document having the form barcode disposed thereon is faster than processing of the frame of image data on a second document without the form barcode; and
wherein the coordinate system is established relative to the at least one corner.

10. A method according to claim 9 further comprising identifying from the form barcode a form design, wherein the form design includes information respecting one or more of the location and content of the content fields of the document.

11. A method according to claim 9 further comprising:
decoding the form barcode; and
identifying an entry in a table,
wherein the entry corresponds to information in the form barcode.

12. A method according to claim 9 further comprising computing a transform and using the transform to compute the offset for the content field in the frame of image data.

13. A method according to claim 12 further comprising cropping the frame of image data about the content field.

14. A method according to 9 further comprising finding a reference from the form barcode, wherein the position of the content field is relative to the reference.

15. A method according to claim 14 further comprising:
attempting to decode the form barcode; and
identifying the reference from the decoded form barcode.

16. A method according to claim 9 further comprising receiving the first document and the second document via automated feeding mechanism.

17. A method according to claim 9 wherein the position of the content area is embedded in the form barcode.

18. A method according to claim 9 wherein the processing is completed on an external server external to an indicia reading terminal for capturing the frame of image data.

* * * * *